US007360174B2

(12) United States Patent
Grossman et al.

(10) Patent No.: US 7,360,174 B2
(45) Date of Patent: Apr. 15, 2008

(54) CONTACT USER INTERFACE (75) Inventors: Joel K. Grossman, Seattle, WA (US);
Cornelis K. van Dok, Bellevue, WA
(US); Jonathan D. Perlow, Seattle, WA
(US); Vivien Park, Seattle, WA (US);
Sandra B. Barnat, Seattle, WA (US);
Debra L. Weissman, Redmond, WA
(US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 10/324,250

(22) Filed: Dec. 19, 2002

(65) Prior Publication Data
US 2004/0119760 A1 Jun. 24, 2004

(51) Int. Cl.
G06F 3/048 (2006.01)
G06F 3/00 (2006.01)

(52) U.S. Cl. .................. 715/854; 715/719; 715/848

(58) Field of Classification Search ............... 715/854, 715/848, 719; 345/854
See application file for complete search history.

(56) References Cited

U.S. PATENT DOCUMENTS

| 5,214,756 | A | | 5/1993 | Franklin |
| 5,640,565 | A | * | 6/1997 | Dickinson ............... 707/103 R |
| 5,737,726 | A | * | 4/1998 | Cameron et al. ............... 705/7 |
| 5,767,897 | A | | 6/1998 | Howell |
| 5,870,744 | A | | 2/1999 | Sprague |
| 5,873,108 | A | | 2/1999 | Goyal |
| 5,913,032 | A | | 6/1999 | Schwartz |
| 5,923,848 | A | * | 7/1999 | Goodhand et al. .......... 709/219 |
| 5,950,193 | A | | 9/1999 | Kulkarnia |
| 5,999,208 | A | | 12/1999 | McNerney |
| 6,014,135 | A | | 1/2000 | Fernandes |
| 6,065,012 | A | * | 5/2000 | Balsara et al. .............. 707/102 |
| 6,208,339 | B1 | | 3/2001 | Atlas |
| 6,209,005 | B1 | | 3/2001 | Harker |
| 6,216,122 | B1 | | 4/2001 | Elson |
| 6,247,043 | B1 | | 6/2001 | Bates |
| 6,269,369 | B1 | * | 7/2001 | Robertson ..................... 707/10 |
| 6,339,826 | B2 | | 1/2002 | Hayes |
| 6,434,564 | B2 | * | 8/2002 | Ebert .......................... 707/100 |

(Continued)

FOREIGN PATENT DOCUMENTS

WO WO02/073454 A2 9/2002

OTHER PUBLICATIONS

Microsoft Computer Dictionary, 2002, Microsoft Press, 5th editioin, p. 162.*

(Continued)

Primary Examiner—Weilun Lo
Assistant Examiner—David Phantana-angkool
(74) Attorney, Agent, or Firm—Workman Nydegger (57) ABSTRACT An interface for enabling different contact information for a plurality of different contacts to be aggregated from numerous data stores into a single contact management system includes a window frame for displaying the contact information in a variety of rich views that graphically illustrate patterns existent within the contact information. Some of the available views include hierarchical, organizational, chronological, social, geographical and operational views of the contact information. The interface also enables a user to search through the aggregate contact information by search term and by filter. The interface also includes another window frame for displaying exploded, detailed, or additional information about selected directories and contacts.

40 Claims, 8 Drawing Sheets

U.S. PATENT DOCUMENTS

| | | |
|---|---|---|
| 6,460,074 B1 | 10/2002 | Fishkin |
| 6,539,379 B1* | 3/2003 | Vora et al. ................ 707/6 |
| 6,557,004 B1 | 4/2003 | Ben-Schachar et al. |
| 6,571,235 B1 | 5/2003 | Marpe |
| 6,581,062 B1 | 6/2003 | Draper |
| 6,661,434 B1 | 12/2003 | MacPhail |
| 6,668,281 B1* | 12/2003 | Ayyadurai ............. 709/223 |
| 6,678,685 B2 | 1/2004 | McGill |
| 6,699,125 B2 | 3/2004 | Kirmse |
| 6,701,348 B2 | 3/2004 | Sommerer |
| 6,718,366 B2* | 4/2004 | Beck et al. ............. 709/204 |
| 6,753,889 B1* | 6/2004 | Najmi .................. 715/784 |
| 6,781,608 B1 | 8/2004 | Crawford |
| 6,791,583 B2 | 9/2004 | Tang |
| 6,883,000 B1 | 4/2005 | Gropper |
| 6,959,340 B1* | 10/2005 | Najmi .................. 709/246 |
| 6,983,310 B2* | 1/2006 | Rouse et al. ............ 709/206 |
| 6,985,924 B2 | 1/2006 | Schwartz et al. |
| 6,988,128 B1* | 1/2006 | Alexander et al. ...... 709/206 |
| 6,990,495 B1* | 1/2006 | Grason et al. ........... 707/10 |
| 6,993,712 B2 | 1/2006 | Ramachandran |
| 7,007,149 B2 | 2/2006 | Chung |
| 7,010,572 B1* | 3/2006 | Benjamin et al. ........ 709/206 |
| 7,010,599 B2 | 3/2006 | Shrinivasan |
| 7,010,616 B2 | 3/2006 | Carlson |
| 7,043,471 B2 | 5/2006 | Cheung |
| 7,068,768 B2 | 6/2006 | Barnes |
| 7,076,498 B2 | 7/2006 | Banerjee |
| 7,096,232 B2* | 8/2006 | Doss et al. ............. 707/104.1 |
| 7,130,853 B2 | 10/2006 | Roller |
| 7,139,774 B2 | 11/2006 | Dettinger |
| 7,143,190 B2* | 11/2006 | Christensen et al. ...... 709/246 |
| 7,146,570 B2 | 12/2006 | Yeh |
| 7,149,731 B2 | 12/2006 | Dettinger |
| 7,159,207 B2 | 1/2007 | Tang |
| 7,162,474 B1 | 1/2007 | Harker |
| 7,185,290 B2 | 2/2007 | Cadiz et al. |
| 7,191,210 B2 | 3/2007 | Grossman |
| 7,209,951 B2 | 4/2007 | Goldberg |
| 7,240,298 B2 | 7/2007 | Grossman |
| 2002/0073207 A1 | 6/2002 | Widger |
| 2002/0107914 A1 | 8/2002 | Charisius |
| 2002/0186257 A1 | 12/2002 | Cadiz |
| 2003/0041065 A1 | 2/2003 | Lucovsky |
| 2003/0069874 A1* | 4/2003 | Hertzog et al. ............ 707/1 |
| 2003/0158855 A1 | 8/2003 | Farnham |
| 2003/0210265 A1 | 11/2003 | Haimberg |
| 2004/0083453 A1 | 4/2004 | Knight |
| 2004/0103364 A1 | 5/2004 | Dornback |
| 2004/0107283 A1 | 6/2004 | Paddon |
| 2004/0119732 A1 | 6/2004 | Grossman |
| 2004/0119758 A1 | 6/2004 | Grossman |
| 2004/0119761 A1* | 6/2004 | Grossman et al. ........ 345/854 |
| 2004/0122683 A1 | 6/2004 | Grossman |
| 2004/0122822 A1 | 6/2004 | Thompson |
| 2004/0177082 A1 | 9/2004 | Nitta |
| 2004/0210844 A1 | 10/2004 | Pettinati |
| 2004/0235520 A1* | 11/2004 | Cadiz et al. ............. 455/557 |
| 2004/0243935 A1 | 12/2004 | Abramovitch |
| 2005/0015439 A1 | 1/2005 | Balaji |
| 2005/0080805 A1 | 4/2005 | Haeberle |
| 2005/0091072 A1 | 4/2005 | Dunn |
| 2005/0131888 A1 | 6/2005 | Tafoya |
| 2005/0182741 A1 | 8/2005 | Grossman |
| 2005/0262208 A1* | 11/2005 | Haviv et al. ............ 709/206 |
| 2006/0010104 A1 | 1/2006 | Pettinati |
| 2006/0041545 A1 | 2/2006 | Heidloff |
| 2006/0053384 A1 | 3/2006 | Le Fetra |
| 2006/0064645 A1 | 3/2006 | Neven |
| 2006/0253787 A1 | 11/2006 | Fogg |
| 2006/0277213 A1 | 12/2006 | Robertson |

OTHER PUBLICATIONS

Anderson, T., *Change Your Outlook*, Developer Network Journal, No. 25, p. 50-1, Jul.-Aug. 2001.

Taylor, T.C., *Databases Save Time And Customers*, Sales & Marketing Management, vol. 142, No. 4, p. 105-7, Mar. 1990.

Kubota, K.; Masuno, H., *Multi-Media Software PI*, NEC Technical Journal, vol. 41, No. 13, p. 72-6, Nov. 1988.

Pettigrew, T., *ACT!—Automated Contact Tracking*, CA Magazine, vol. 95, No. 1022, p. 48-9, Sep. 1991.

Simaioforidis, A.; Karlgren, J.; Ereback, A., *Research and Advanced Technology for Digital Libraries, Second European Conference, ECDL '98. Proceedings*, p. 673-4, Sep. 21-23, 1998.

Heller, S.R., *Symantec ACT! 4.0 for Windows*, Journal of Chemical Information and Computer Sciences, vol. 38, No. 4, p. 772, Jul.-Aug. 1998.

U.S. Appl. No. 11/760,392, filed Jun. 8, 2007, inventor Grossman.

Padwick, Feddema, Special Edition Using Microsoft Outlook 2000, Que, Ch. 9 'Managing Contacts', p. 1-17.

Padwick, Feddema, Special Edition Using Microsoft Outlook 2000, Que, Ch. 16 'Managing Your Computer Environment': Using Other Shortcuts in the Outlook Bar, p. 1-4.

Padwick, Feddema, Special Edition Using Microsoft Outlook 2000, Que, Ch. 18 'Finding and Organizing Outlook Items': Using the QuickFind Contact Tool, p. 1-4.

Padwick, Feddema, Special Edition Using Microsoft Outlook 2000, Que, Ch. 18 'Finding and Organizing Outlook Items': Organizing Outlook Items, p. 1-7.

Padwick, Feddema, Special Edition Using Microsoft Outlook 2000, Que, Ch. 22 'C reating and Using Rules', p. 1-5.

Padwick, Feddema, Special Edition Using Microsoft Outlook 2000, Que, Ch. 38 'Creating Views and Print Styles', p. 1-25.

Padwick, Feddema, Special Edition Using Microsoft Outlook 2000, Que, Ch. 41 'Creating and Using Custom Fields': Why Do You Need Custom Fields?, p. 1-14.

Padwick, Feddema, Special Edition Using Microsoft Outlook 2000, Que, Ch. 41 'Creating and Using Custom Fields': Creating a Simple Custom Field, p. 1-3.

Padwick, Feddema, Special Edition Using Microsoft Outlook 2000, Que, Appendix C 'Outlook's Files, Folders, Fields, and Registry Keys', p. 1.

Mihamed; "Marketcircle a recipient of the 2002 Apple Design Awards"; May 15, 2002; Marketcircle.

Hibbert, Chris, "Visual Flex and XML", downloaded from www.dataaccess.com/whitepapers/xml/XMLWP.htm, dated by Wayback Machines as: May 2, 2001, pp. 1-25.

Dogac, Asuman, et al., "An ebXML Infrastructure Implementation through UDDI Registries and RosettaNet PIPs", ACMSIGMOD 2002, Madison, WI, Jun. 4-6, 2002, pp. 512-523.

Ren, Ligang, et al., "Data Synchronization in the Mobile Internet", The 7th Intl Conf on CSCW in Design, Sep. 25-27, 2002, pp. 95-98.

Lee, Jinho, et al., "An Evaluation of the Incorporation of a Semantic Network Into a Multidimensional Retrieval Engine", CIKM 03 New Orleans, LA, Nov. 3-8, 2003, pp. 572-575.

Su, Hing, et al., "Automating the Transformation of XML Documents", WIDM 2001, Atlanta, GA. Nov. 2001, pp. 68-75.

McCabe, M. Catherine, et al., "On the Design and Evaluation of a Multi-Dimensional Approach to Information Retrieval", SIGIR 2000, Athens, Greece, Jul. 2000, pp. 363-365.

Bussler, Chrisoph, et al., "A Conceptual Architecture for Semantic Web Enabled Services", SIGMOD Record, vol. 31, No. 4, Dec. 2002, pp. 24-29.

Nejdl, Wolfgang, et al., "EDUTELLA: A P2P Networking Infrastructure Based on RDF", WWW 2002, Honolulu, HI, May 7-11, 2002, pp. 604-615.

Bychkov, Yury, et al., "Interactive Migration of Legacy Databases to Net-Centric Technologies", Proceedings of the 8th Working Conference on Reverse Engineering, Oct. 2-5, 2001, pp. 328-334.

Bakker, John-Luc, et al., "Next Generation Service Creation Using XML Scripting Languages", IEEE International Conference on Communications, vol. 4, Apr. 22 May 2, 2001, pp. 2001-2007.

Office Action mailed Jun. 22, 2007 cited in related U.S. Appl. No. 10/692,257.
Notice of Allowance mailed Mar. 27, 2007 cited in related U.S. Appl. No. 10/324,251.
Office Action mailed Aug. 3, 2007, cited in related U.S. Appl. No. 10/324,243.
Office Action mailed Jun. 5, 2007, cited in related U.S. Appl. No. 10/885,974.
Notice of Allowance mailed Jul. 3, 2007, cited in related U.S. Appl. No. 10/324,746.
Notice of Allowance mailed Aug. 8, 2007, cited in related U.S. Appl. No. 10/326,660.
Kim, Sung Wan, et al., "Developing a Native Storage Structure for XML Repository System in Main Memory", 5th International Conference on High Speed Networks and Multimedia Communications, ©2002, pp. 96-100.
Shul, William M., et al., "Application of XML Schema and Active Rules System in Management and Integration of Heterogeneous Biological Data", BIBE '03, Mar. 10-12, 2003, pp. 367-374.
Banerjee, Sandeepan, et al., "Oracle8i - The XML Enabled Data Management System", 16th International Conference on Data Engineering, San Diego, CA Feb. 29-Mar. 3, 2000, pp. 561-568.

Haas, L.M., et al. "Transforming Heterogeneous Data with Database Middleware: Beyond Integration", Bulletin of the IEEE Computer Society Technical Committee on Data Engineering, ©1997, pp. 1-6.
Nambiar, Uilas, et al., "Current Approaches to XML Management", IEEE Internet Computing, vol. 6, Issue4, Jul./Aug. 2002, pp. 43-51.
Lear, Ann C., et al, "XML Seen as Integral to Application Integration", IT Professional, vol. 1, Issue 5, Sep./Oct. 1999, pp. 12-16.
Paul McFedries, Complete Idiot's Guide to Windows XP, Pub Date: Oct. 3, 2001, pp. 1-3.
Paul Thurrott's SuperSite for Windows: Internet Explorer 5.0 Reviewed. Duke Communications International, Inc. 2000 pp. 1-8.
Office Action dated Aug. 17, 2007 cited in related U.S. Appl. No. 10/780,496.
Office Action dated Aug. 23, 2007 cited in related U.S. Appl. No. 10/845,484.
Office Action dated Oct. 5, 2007 cited in related U.S. Appl. No. 10/885,974.
Notice of Allowance dated Oct. 5, 2007 cited in related U.S. Appl. No. 10/326,660.

* cited by examiner

CONTACT USER INTERFACE

BACKGROUND OF THE INVENTION

1. The Field of the Invention

The present invention relates to user interfaces in computers and electronic devices and, more particularly, to methods, systems, and computer program products for displaying contact information corresponding to a contact management system with a user interface.

2. Background and Relevant Art

A contact management system is generally referred to in this application as a system, directory or database that contains contact information about people, groups, organizations, businesses, households, or any other identifiable entity, each of which is referred to herein as a contact.

Contact management systems are extensively used in the computer industry to store and display contact information that is pertinent to the corresponding software applications to which they belong. For example, email applications typically include directories for storing and displaying the email addresses of contacts that can be emailed. Money management applications typically include directories for storing contact information about related financial contacts, such as, for example, banks, accounting service organizations, financial planning organizations, and so forth. Other examples of software applications that utilize contact management systems include time management applications, instant messaging applications, network gaming applications, business directory applications, telephony applications, and so forth.

Contact management systems are also widely used in many hardware devices that are not considered traditional computers. For example, many telephones, facsimile devices, and photocopying devices also include contact management systems for storing contact information that may be used to perform a desired function such as initiating a telephone call, a facsimile transmission, or a telecopy transmission.

One problem encountered by existing contact management systems, however, is that the large variety of specialized and disparate contact management systems can make it difficult for a user to quickly access all available contact information for the various applications at the same time. This can be a problem, for example, when a user desires to identify all available means for making contact with a given entity because it may require the user to separately access various directories from many different contact management systems in order to obtain the desired contact information. For example, it may be necessary to access a telephone directory to obtain the home or cell telephone number for the contact, an email directory to obtain a primary email address for the contact, a business directory to obtain the business telephone number, and business email address of the entity, and so forth.

Having disparate contact management systems can also be a problem for obtaining different types of contact information about different contacts. For example, it may be desirable to view the email address of a first contact, the business telephone number of a second contact, and the cell telephone number of a third contact. If the desired contact data for each of the different entities is located in a different contact management system of different applications, then each application will have to be accessed to obtain the desired information, thereby requiring the undesirable expenditure of time and resources.

Searches and queries for specific contacts or contact information must also be performed separately on each of the various contact management systems. This can particularly be a problem when a user has forgotten in which of the contact management system directories the contact information is stored.

To overcome some of these problems, some contact management systems are configured to store more contact information then is required for the corresponding application. For example, an email directory may be configured to store the addresses, phone numbers and other information about the various contacts stored therein. However, the interfaces and limitations for displaying contact information typical vary from one application to the next, thereby making it difficult to become customized to the various contact management systems. Furthermore, it would be somewhat onerous to duplicatively enter every piece of contact information about every contact into every utilized contact management system, even if it were possible. This redundant storage would also represent undesirable and unnecessary expenditure of resources.

Another problem with existing contact management systems is that because they are so specialized, they fail to provide very extensive and rich search and view capabilities of the contact information. In particular, most contact management systems are relegated to providing only two-dimensional columns or lists of the stored data. Yet another problem with existing contact management systems is that they do not enable a user to view, create, and edit relationships between contacts. More particularly, existing systems do not enable a user to view the relationships existing between contacts or to create and edit these relationships.

Accordingly, there currently exists a need in the art for improved contact management systems and interfaces for accessing contact information.

BRIEF SUMMARY OF THE INVENTION

The present invention is directed to improved contact management systems, methods for use, and corresponding computer program products and interfaces for accessing contact information from a plurality of disparate directories that are located in one or more data stores.

According to one embodiment, the contact management system includes a user interface that provides access to aggregated contact information from a plurality of local and remote data stores. The contact information may be consolidated into a single store or accessed discretely from a plurality of disparate data stores.

During use, the interface and corresponding modules of the invention enable the aggregate contact information to be comprehensively searched by search terms and to be filtered by classification. The interface also enables the aggregate contact information to be displayed in a variety of rich views that graphically illustrate existing hierarchical, organizational, chronological, social, geographical and operational patterns of the contact information.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to improved methods, systems, and corresponding computer program products and interfaces for obtaining and displaying desired contact information from one or more contact information directories. The embodiments of the present invention may comprise or be performed with a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Operating Environment

Figure 1:
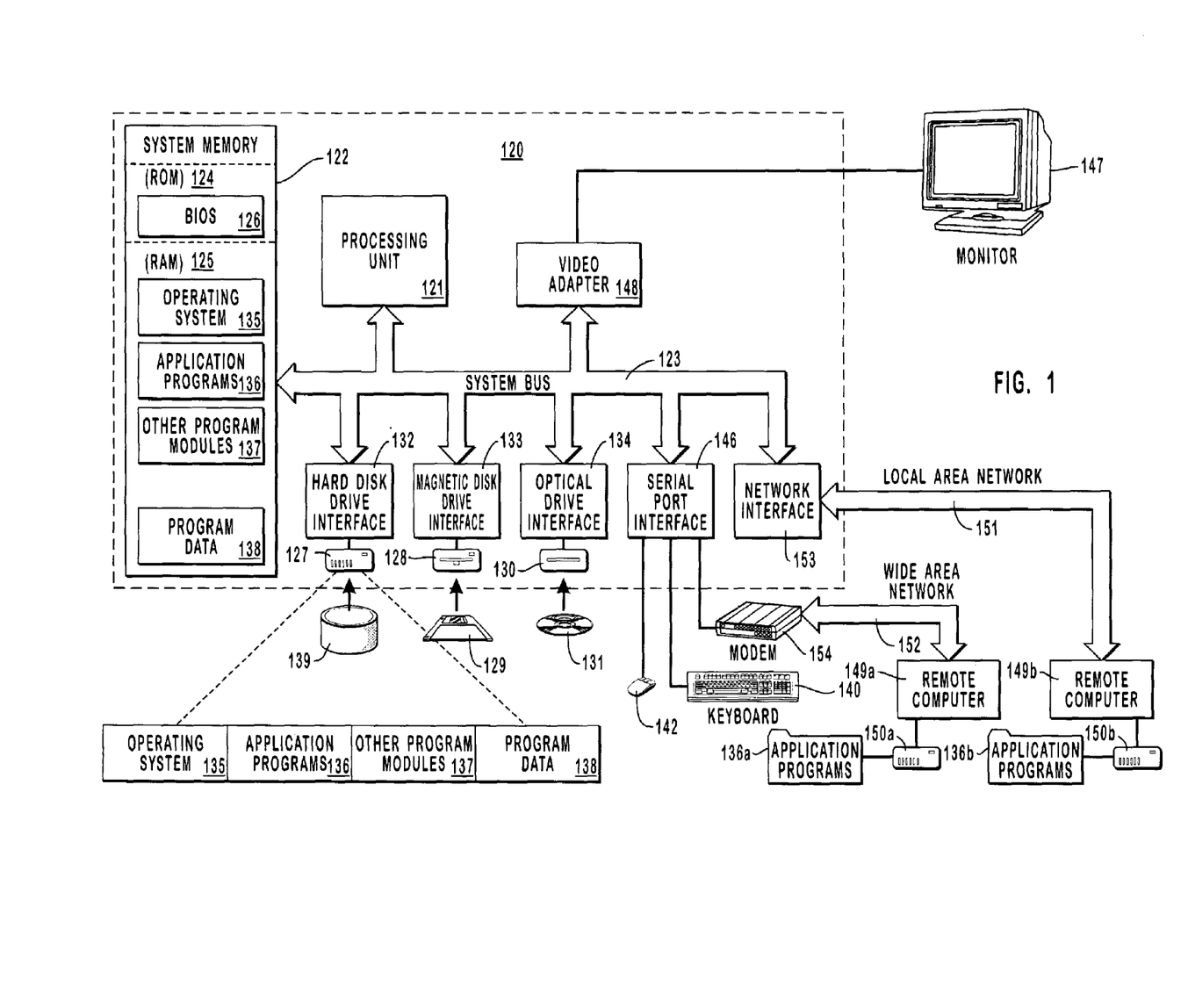
FIG. 1 illustrates one embodiment of an operating system that provides a suitable operating environment for the present invention.

FIG. 1 and the following discussion are intended to provide a brief, general description of a suitable computing environment in which the invention may be implemented. However, it should be emphasized that the present invention is not necessarily limited to any particular computerized system and may be practiced in a wide range of computerized systems including, but not limited to telephone and other communication devices, PDAs, information kiosks, and so forth.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing system in the form of a conventional computer 120, including a processing unit 121, a system memory 122 comprising computer readable media, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 20 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
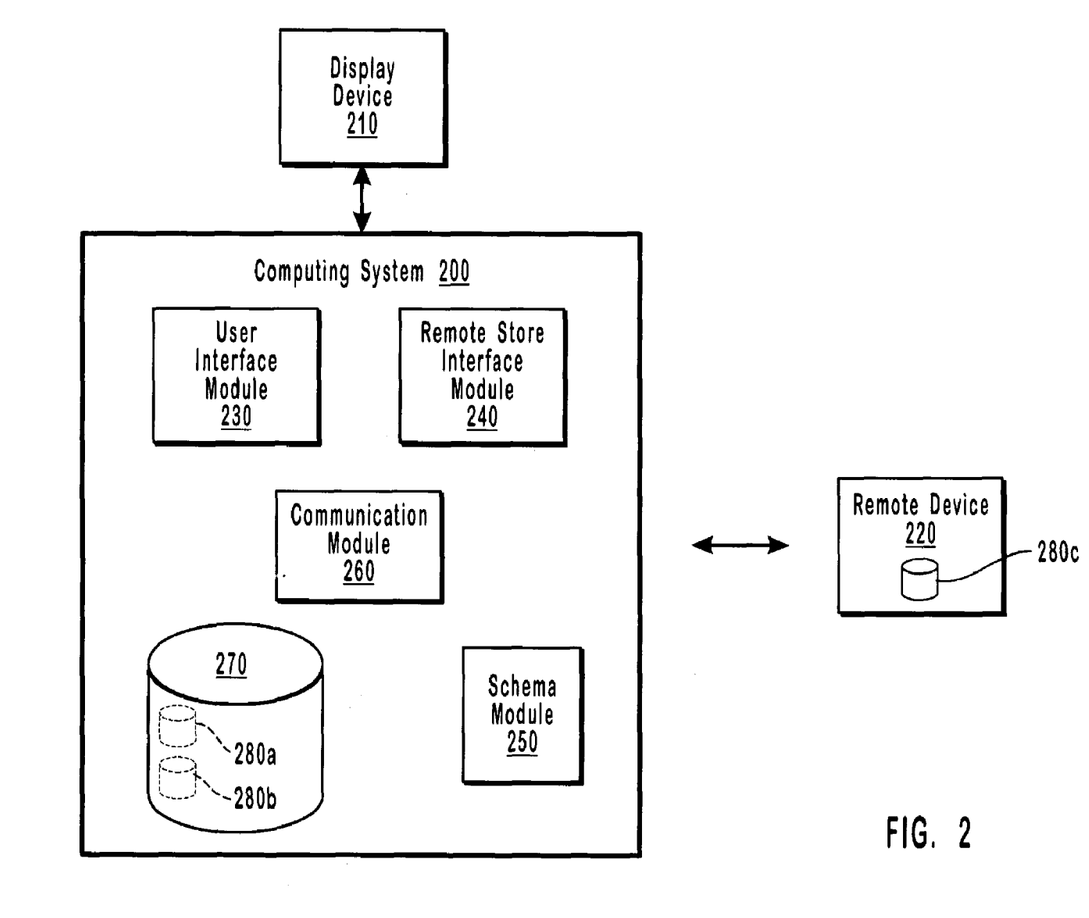
FIG. 2 illustrates one embodiment of a functional block diagram of the contact management system of the invention.

FIG. 2 illustrates a functional block diagram of several components of the invention. As shown, a computing system 200 is connected with a display device 210 and a remote device 220. The connection link between each of these components may be a physical connection or a wireless connection. It will be appreciated that the display device 210 may be located remotely from the computing system 200 or integrally connected with the computing system 200. The display device 210 may comprise any screen, monitor, or other device that is configured to display images.

During use the computing system utilizes a user interface to display desired contact information at the display device. The functionality of the user interface to display desired contact information is enabled by various computer modules, such as user interface module 230, remote store interface module 240, schema module 250 and communication module 260, each of which will now be described.

The user interface module 230 includes sufficient computer executable instructions for operably displaying a user interface at the display device and for responding to user input entered at the user interface. The remote store interface module 240 includes sufficient computer executable instructions for searching and processing contact information stored at remote devices, such as remote device 220. Remote device 220 may be a remote computer, server containing contact information.

The schema module 250 contains sufficient computer executable instructions for mapping contact information into categories and classifications that can be recognized by the user interface for display on the display device 210. The categories and classifications defined by the schema module 250 enable the contact information to be filtered and displayed into the designated categories and classifications, as described below. The schema module 250 is useful for enabling contact information from remote stores to be organized according to a single unifying schema. The schema module 250 may also be used to map and identify contact information stored in local stores, such as storage media 270.

The communication module 260 includes sufficient computer executable instructions for enabling communication between the various modules, as well as the display device 210, the remote device 220, and the storage media of the remote device 220 and computing system 200. In particular, the communication module enables the modules to access and process contact information that is stored in one or more contact information directories that may be stored locally and remotely. The communication module may be associated with a sync module for replicating data from remotes stores to local stores, as well as a query module, for enabling the computing system to perform queries to the remote stores for contact information contained therein.

The present embodiment illustrates three contact information directories, 280a, 280b, and 280c. For example, directory 280a may correspond to an email application and directory 280b may correspond to a telephony application. It will be appreciated, however, that the invention is not limited to use with any particular number of contact information directories or applications to which they correspond.

My Contacts Interface and Methods of Use

Figure 3:
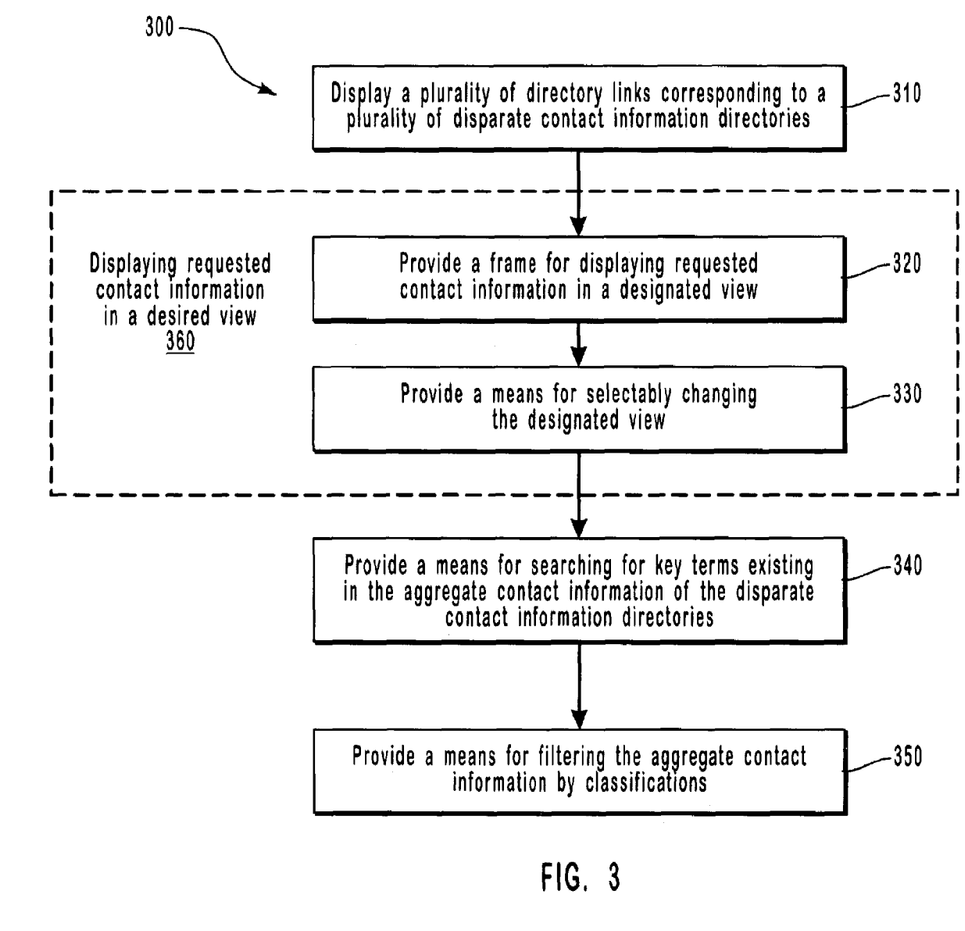
FIG. 3 is a flow chart illustrating certain acts of a method for displaying contact information according to the invention.

FIG. 3 illustrates a flowchart 300 of one method for displaying aggregate contact information from a plurality of disparate contact information directories in a variety of rich views. As illustrated, the method includes various acts and a step (step 360) for displaying the aggregate contact information.

The first illustrated act includes displaying a plurality of directory links corresponding to a plurality of disparate contact information directories (act 310). Next, the method includes a step for displaying requested contact information in a desired view (step 320). According to one embodiment, step 320 includes corresponding acts of providing a frame for displaying requested contact information in a designated view (act 320) and of providing means for selectably changing the designated view (act 330). It will be appreciated, however, that step 320 may include any corresponding acts that are suitable for displaying the requested contact information in a desired view. The final illustrated acts include an act of providing means for searching for key terms existing in the aggregate contact information of the disparate contact information directories (act 340), and an act of providing means for filtering the aggregate contact information by classifications (act 350).

Although acts 310, 320, 330, 340 and 350 are shown and identified in a particular sequence, it will be appreciated that the invention is not limited to performing the illustrated acts in any particular order. Accordingly, the acts 310, 320, 330, 340 and 350 may be performed simultaneously or in a different sequence than presently illustrated. Each of the illustrated acts 310, 320, 330, 340 and 350 will now be shown and described with specific reference to FIGS. 4-9.

Figure 4:
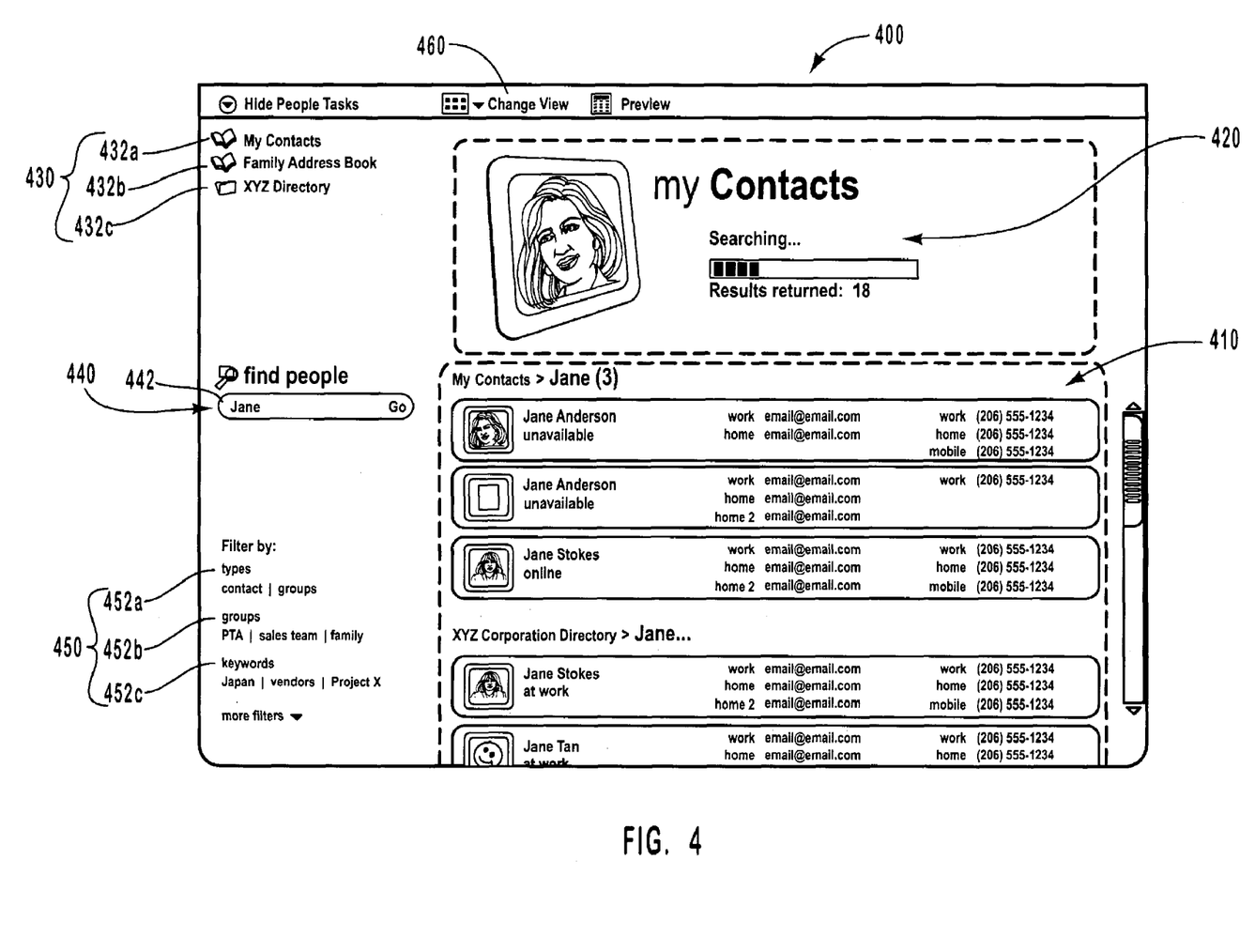
FIG. 4 illustrates one embodiment of a user interface for displaying contact information.

FIG. 4 illustrates one embodiment of a user interface 400 that may be utilized for performing the acts described above. As shown, the user interface comprises a plurality of visual components including a primary display frame 410, a secondary display frame 420, a list 430 of directory links 432a, 432b, 432c, a search pane 440 with an input field 442, a list 450 of filters 452a, 452b, 452c and a pull down menu button 460 that can be selected to see a list of views that can be used to display contact information in the primary display frame 410.

The list 430 of directory links may identify any number of contact information directories from which contact information may be obtained. The contact information directories may by application specific directories, such as an email application directory, or a network directory, such as a company information directory. The directories may be located on a single storage medium or disposed in a plurality of disparate storage medium. As eluded to above, in reference to FIG. 2, the interface 400 may obtain and display the contact information through physical connections or wireless connections to the one or more disparate storage medium, utilizing any combination of modules 230, 240, 250, and 260 the computing system 200.

When one of the listed directories is selected, the interface 400 obtains and displays the contact information from the selected directory in the primary display frame 410. As defined herein, the term "contact" generally refers to any person, group, organization, business, or other type of identifiable entity and the term "contact information" generally refers to any information that corresponds to a contact and that may be considered relevant for contacting, accessing, corresponding or communicating with the contact. Non-limiting examples of contact information include names, aliases, telephone numbers, email addresses, images, symbols, home addresses, instant message (IM) addresses, relationships with other contacts, web addresses. Contact information can also refer to other types of information such as the status of a contact. For example, information indicating a contact is currently online, or on a telephone line may also be broadly considered as contact information.

In the present embodiment, the interface 400 displays contact information including the names, email addresses, telephone numbers, and images associated with the contacts identified in the selected directory. It will be appreciated, however, that any amount of identifiable contact information can be displayed to accommodate different needs and preferences. Accordingly, the interface may include menus (not shown) for configuring the amount of contact information that will be provided. Likewise, even though a limited number of contacts is shown, it will be appreciated that the interface 400 may display any number of contacts as desired by sizing them appropriately. If the selected directory includes more contacts than displayed in the frame 410, then traditional tools for scrolling through or expanding the list of the additional contacts may be displayed and utilized by the interface 400.

When a contact is selected, such as with a mouse pointer or any other means, the contact information corresponding to the selected contact can be displayed in the secondary frame 420. In one embodiment, the contact information displayed in the secondary frame 420 consists of the same contact information displayed in the primary frame 410, only enlarged or rearranged. According to another embodiment, the contact information displayed in the secondary frame 420 includes additional information about the contact than is displayed in the primary frame 410. The secondary frame 420 may also display tasks that can be done with that contact (e.g., send IM to the contact, send email to the contact, and so forth).

The secondary frame 410 can also be used to provide contact information about the directory links listed in list 430. By way of example, the secondary frame 410 may display the contact information, such as a business card and image, for a business that corresponds with a business contact information directory, for example.

As shown, the interface 400 also includes means for searching for key terms that may exist in the aggregate contact information of the plurality of disparate contact information directories (act 340). In particular, the search pane 440 may be used to enter a key term that may comprise part of a name, an address, or an attribute that can be used to search for desired contact information. For example, by typing the name "Jane," one or more of the contact information directories is searched for contact information corresponding with the name "Jane." As shown in the present embodiment, various Jane contacts from the My Contacts directory and the XYZ Corporation directory are displayed. It will be appreciated, however, that this example is merely illustrative and that a search can be performed by supplying other terms or symbols that are associated with a contact. For example, a search can be performed by supplying a telephone number and searching for one or more contacts associated with the telephone number.

It will also be appreciated that the invention extends to both embodiments in which a plurality of directories are searched, as shown, as well as embodiments in which only individually selected directories are searched. The key term that is entered may also comprise a filter term, such as an attribute characterizing a type of group or classification. For example, the key term "sales team A" may be used to identify all contacts belonging to sales team A. The types of classifications and groups that can be associated with the contacts is determined by the schema module 250, described above. Filtering can also be based on relationships between the contacts. For example, a filtered search can be performed for everyone in the same household as Contact A or who works for the same organization as Contact B, and so forth. The filters may be customizable and specifically tailored to search corresponding directories. For example, a job title filter may be provided when searching a corporate directory. Likewise, an online status filter may be provided when searching through the personal contacts directory, and so forth.

The interface 400 may also include a list 450 of filters that may be utilized with or without the search pane 450 for filtering the aggregate contact information by classification, as described above. Any number of filters may be used at the same time. The filters may be provided as links, as check box items, or as any other selectable object. The number and type of filters that may be included with the interface may be modified to accommodate any need and preference. Although the list 450 of filters, the list 430 of directories, and the search pane 440 are presently displayed with the interface, it will also be appreciated that these components may be hidden behind pull down menus so as to provide more room for the primary and secondary panes 410. The secondary pane 420 can also be hidden, if desired, to provide more room for the primary pane 410.

One example of a pull down menu object that can be used to hide available information is the view menu object 460. When the view menu object 460 is selected, a list of available views are presented for selection by the user (not shown). Each of the views that are identified by the Change View menu object 460 corresponds with a different pattern for displaying the contact information. Non-limiting examples of some views that may be utilized by the interface to display the contact information will now be shown and described with specific reference to FIGS. 5-9.

Figure 5:
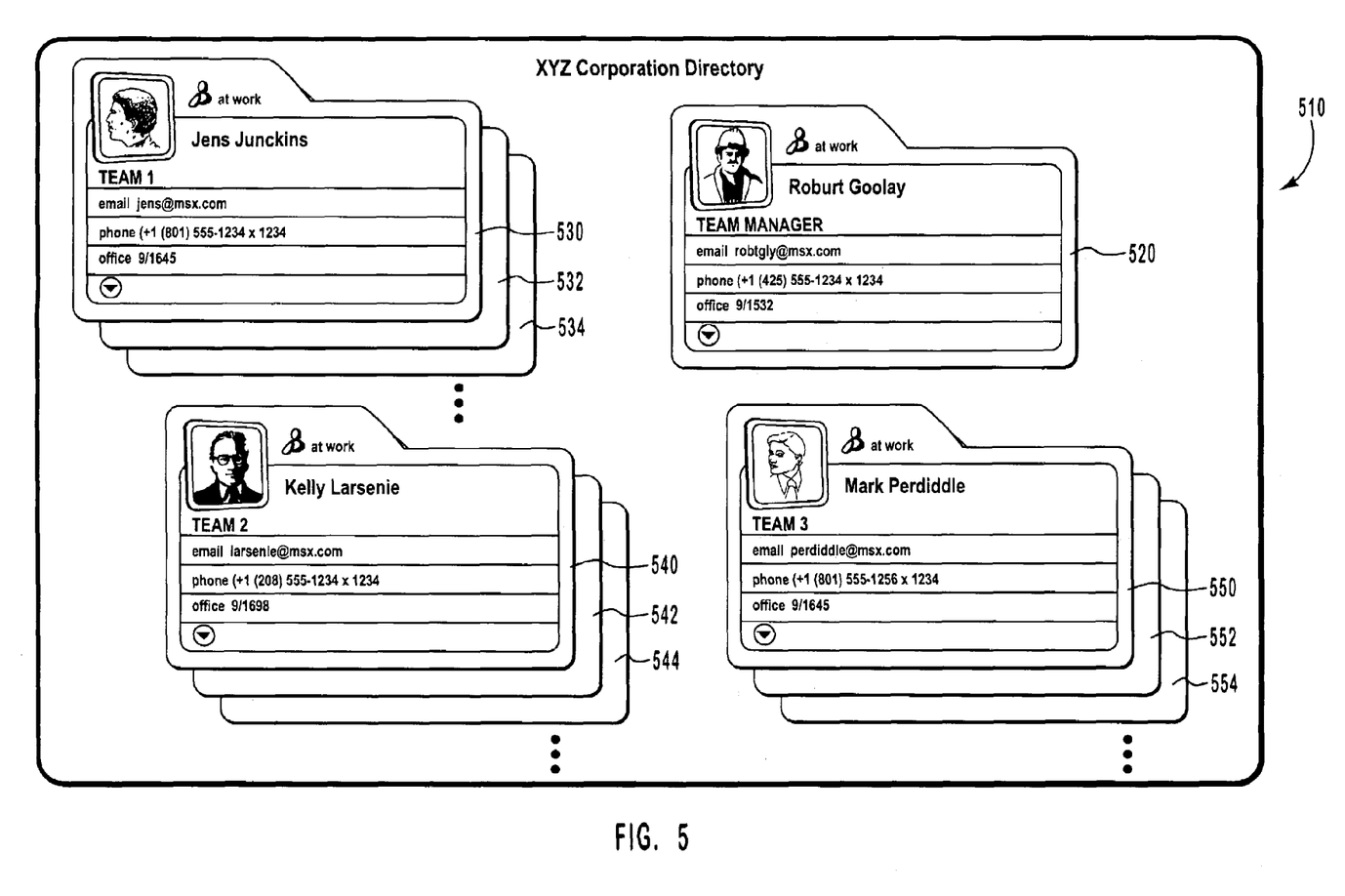
FIG. 5 illustrates one embodiment of a contact view frame for displaying contact information in an organizational and hierarchal grouping.

FIG. 5 illustrates one example of a primary frame 510 that has been configured to display an organizational view of contact information. As shown, the organizational view corresponds with an organizational pattern that associates the identified contacts in the primary frame 510. In particular, a team manager 520 is placed alone in the frame 510 and the contacts of the various teams that are subordinate to the team manager 520 are grouped together next to the team manager 520. The contacts of each of the groups can be organized randomly or in a desired hierarchal order.

In the present example, the teams are organized in hierarchal order. For example, the team leaders 530, 540 and 550 are displayed on top of each grouping, with the subordinates of each team displayed below the team leaders 530. In particular, team members 532, 534, etc. are shown to be subordinate to team leader 530. Likewise, team members 542, 544, etc. are shown to be subordinate to team leader 540, and team members 552, 554, etc. are shown to be subordinate to team leader 550. When a team leader 530 is selected, such as with a mouse pointer, the interface may display the organizational or hierarchal view of the selected team, while the specific contact information of team leader 530 is isolated or displayed in the secondary frame 420, which is described above. Hovering a mouse pointer over any of the contact object cards may also display the contact information of the corresponding contact in the secondary frame 420.

Figure 6:
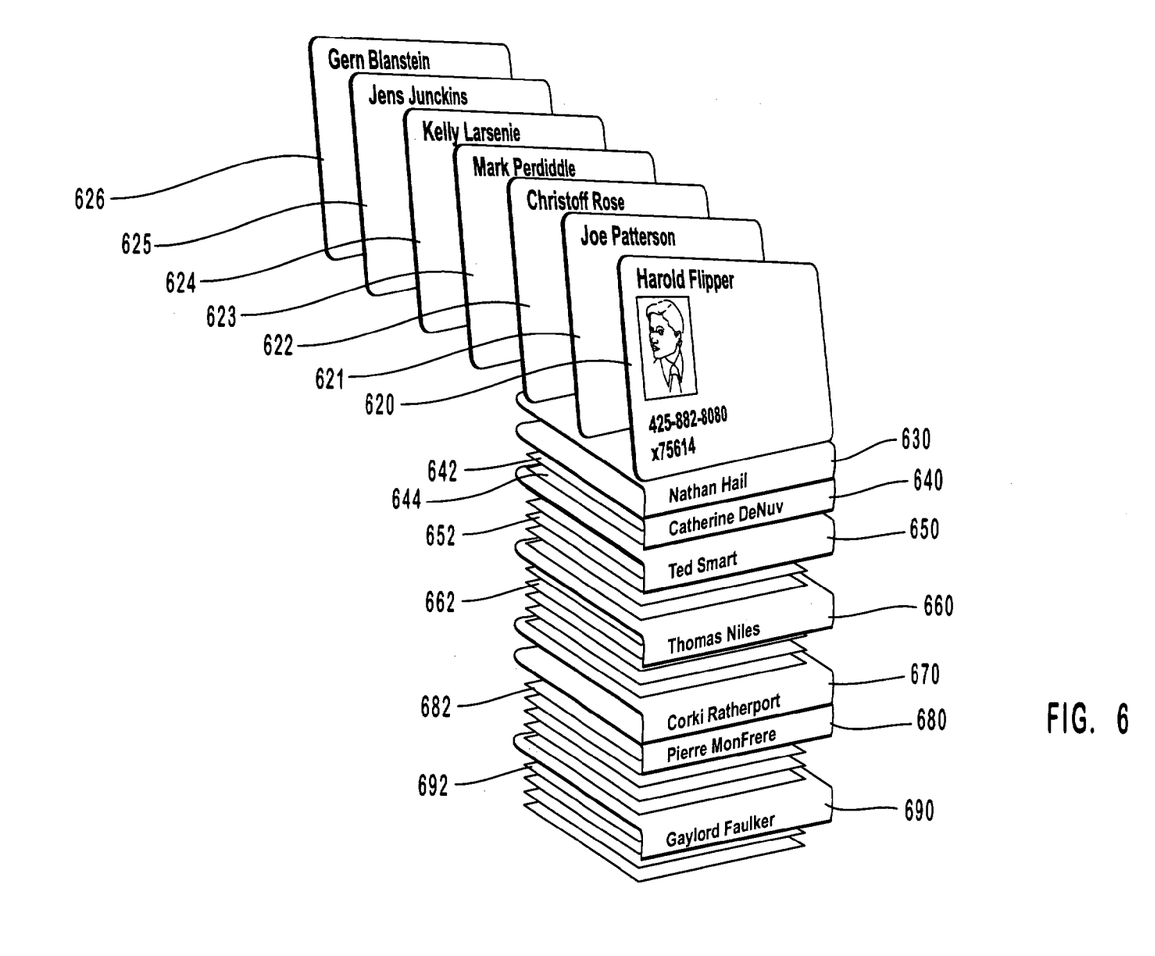
FIG. 6 illustrates another embodiment of a contact view frame for displaying contact information in an organizational and hierarchal grouping.

FIG. 6 illustrates another example of a primary frame 610 that has been configured to display an organizational view of contact information. As shown, the organizational view corresponds with an organizational pattern that associates the identified contacts in a three-dimensional hierarchal grouping. In particular, each leader is identified as overlaying the contacts that are subordinate to the identified leader. For example, contacts 642 and 644 are subordinate to contact 640; contact 652 is subordinate to contact 650; contact 692 is subordinate to contact 694, and so forth. By selecting a leader, the interface displays the contact information of the selected leader, such as leader 620. The subordinates to the selected leader 620 can be displayed behind the selected leader 620, such as contacts 621, 622, 623, 624, 625, and 626 are displayed behind leader 620. It will be appreciated that any other graphical grouping or hierarchal structure may be used to display the organizational relationships of two or more contacts.

Figure 7:
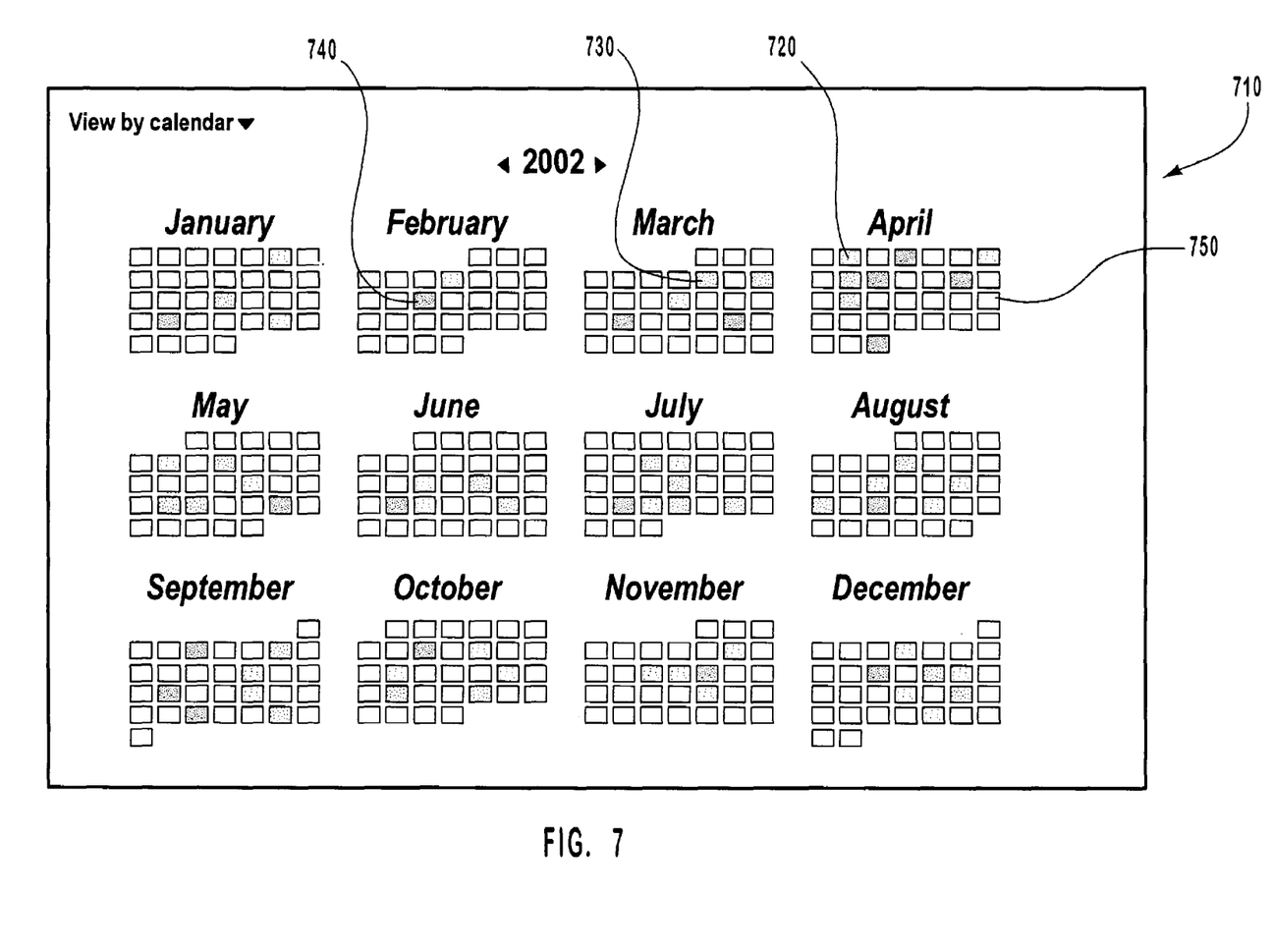
FIG. 7 illustrates one embodiment of a contact view frame for displaying contact information in an event grouping.

FIG. 7 illustrates one example of a primary frame 710 that has been configured to display an event view of contact information. As shown, the event view corresponds with events that associate two or more contacts. It will be appreciated that the types of events that can associate contacts is limitless. However, the present example is given with respect to calendar events, such as a birth date. For example, in the present example, the primary frame 710 displays a year's worth of monthly calendars. Each calendar includes boxed objects corresponding with the days of the month. Some of the objects are shaded, such as objects 720, 730, 740, while other objects, such as object 750, are not. The shading can be used, for example to identify groupings of contacts that are associated with the corresponding calendar day. In one embodiment, a light shading can be used to indicate only a single contact has a birth date corresponding with the indicated date. A medium shading can be used to indicate a few contacts share the indicated birth date. A heavy shading can be used to indicate a large number of contacts share the indicated birth date. By selecting on one of the shaded objects 720, 730, 740, the contacts associated with the selected object can be displayed in a listing or any other manner.

Figure 8:
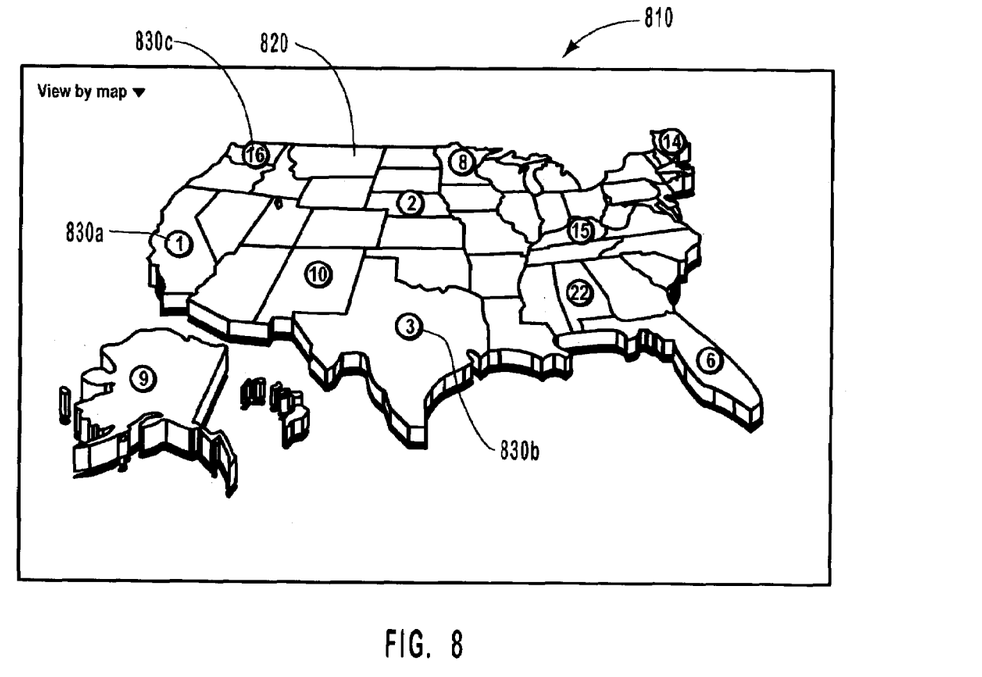
FIG. 8 illustrates one embodiment of a contact view frame for displaying contact information in a location grouping.

FIG. 8 illustrates one example of a primary frame 810 that has been configured to display a location view of contact information. As shown, the location view corresponds with a location pattern that associates the identified contacts in the primary frame 810. Non-limiting examples of locations that can associate contacts include actual locations (e.g., geographic and structural), virtual locations (e.g., location on the Internet or another Networks, online status), and locations defined by time (e.g., time-zone or when a last communication was sent, etc.). In the present example, the location view includes a map 820 that illustrates the actual location of contacts. For example visual object 830a, 830b, 830c indicate a number of contacts residing in the corresponding states. Accordingly, the selection of a state having one or more contacts will cause the interface to display the contacts residing in the selected state.

Figure 9:
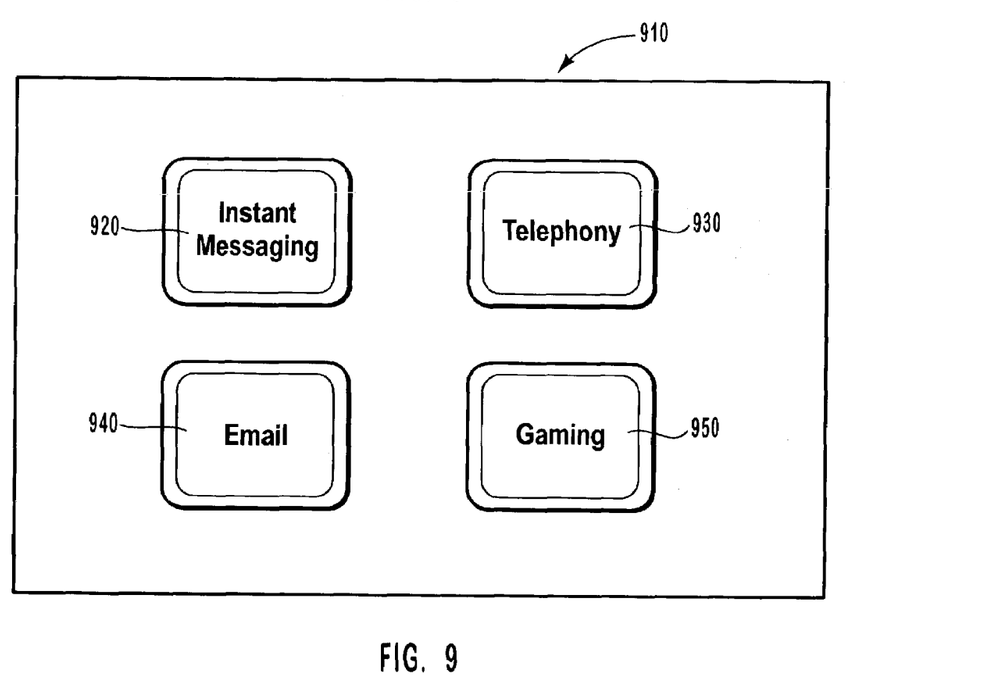
FIG. 9 illustrates one embodiment of a contact view frame for displaying contact information in an operability grouping.

FIG. 9 illustrates one example of a primary frame 910 that has been configured to display an operability view of contact information. As shown, the operability view corresponds with compatibility between the contacts or devices of the contacts for communication or collaboration. For example, in the present example, the primary frame 910 illustrates various objects 920, 930, 940, 950 that can be selected to display all of the contacts that have compatible systems for connecting with the user's system for instant messaging (920), telephony (930), email (940) and gaming (940).

Various examples of views that can be displayed by the primary frame 410 of the interface have been provided above. However, it will be appreciated that these examples are not intended to limit the scope of the invention. In particular, the invention extends to any embodiment in which an interface can display hierarchal, graphical, or other relationships existing between contacts.

By way of another example, the interface may also provide a social view configured to display a social pattern existing between at least two contacts. The interface can also display contact associations based on group, family, and any other relationships defined by the schema module 250, described above, or as defined by a user.

In summary, the methods, systems and computer program products of the invention include and interface for enabling different contact information for a plurality of different contacts to be aggregated and displayed in a variety of rich views. The to interface also enables the aggregate contact information to be searched and filtered based on existing and customized search options.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that is connected with a display device and that includes a user interface that is configured to display contact information at the display device, a method for displaying aggregate contact information from a plurality of separate and distinct contact information directories, the method comprising:
    an act of searching a plurality of separate and distinct contact information directories for contact information, wherein each of the separate and distinct contact information directories independently store contact information corresponding to one or more contacts;
    an act of mapping the contact information from the separate and distinct contact information directories according to a single unifying schema;
    an act of displaying, at the display device, a plurality of directory links, each directory link corresponding to a separate and distinct contact information directory,
        the directory links operably and correspondingly connecting the user interface with each of the plurality of separate and distinct contact information directories,
        the user interface being configured to display requested contact information for any contacts identified within a contact information directory corresponding to a selected directory link,
        the displayed contact information being organized in accordance with the single unifying schema used to map the contact information from the separate and distinct contact information directories for presentation at the user interface, and
        the contact information from the separate and distinct contact directories being aggregated for simultaneous presentation at the user interface and simultaneously made directly accessible from the separate and distinct contact information directories through the user-interface; and
    an act of providing a frame at the display device that is configured for simultaneously displaying the aggregated contact information from the separate and distinct contact information directories in one of a plurality of selectable views that each correspond to a different pattern that is identifiable within the displayed contact information, wherein at least one view of the selectable views graphically distinguishes different groupings of contacts within said at least one view.

2. A method as recited in claim 1, further including an act of providing means for selectably changing the designated view of the displayed contact information to another one of a plurality of views, each view corresponding with a different pattern that characterizes at least two contacts identified by the displayed contact information.

3. A method as recited in claim 2, wherein means for selectably changing the designated view includes a menu that identifies the plurality of views that can be selected, wherein selection of a new view from the plurality of identified views causes the user interface to display the requested contact information in the new view within the frame.

4. A method as recited in claim 2, wherein the different patterns corresponding to the plurality of views include a organizational pattern that organizationally relates the at least two contacts, such that an organizational view corresponding with the organizational pattern displays an organizational relationship between the at least two contacts with at least one of an organizational hierarchal structure and an organizational grouping from which the contact information of the at least two contacts can be obtained.

5. A method as recited in claim 2, wherein the different patterns corresponding to the plurality of views include an event pattern that relates the at least two contacts, such that an event view corresponding with the event pattern displays event groups from which the contact information of the at least two contacts can be obtained, such that when an event group is selected, the user interface displays any contacts associated with the event.

6. A method as recited in claim 5, wherein the event includes a date corresponding with birthdays, such that the event view displays birthdays of the at least two contacts.

7. A method as recited in claim 2, wherein the different patterns corresponding to the plurality of views include a location pattern that relates the at least two contacts, such that a location view corresponding with the location pattern displays location groupings from which the contact information of the at least two contacts can be obtained, such that when a location grouping is selected, the user interface displays any contacts associated with the location.

8. A method as recited in claim 7, wherein the location includes at least one of a geographic location, a time location, a virtual location, and a structural location.

9. A method as recited in claim 2, wherein the different patterns corresponding to the plurality of views include an operability pattern that relates the at least two contacts, such that an operability view corresponding with the operability pattern displays operability groupings from which the contact information of the at least two contacts can be obtained, such that when an operability grouping is selected, the user interface displays any contacts associated with the corresponding operability.

10. A method as recited in claim 9, wherein the operability includes at least one of telephone, email, instant messaging, and gaming capabilities.

11. A method as recited in claim 1, further including an act of providing means for searching by key term for one or more individual contact entries within the aggregate contact information containing the key term.

12. A method as recited in claim 11, wherein searching means includes an input field that is displayed at the display device and that is capable of receiving input comprising at least part of a name, a word, a term, a telephone number, an email address, and a location.

13. A method as recited in claim 1, further including an act of providing means for filtering the aggregate contact information according to classifications assigned to the aggregate contact information.

14. A method as recited in claim 13, wherein filtering means includes at least one filter link displayed at the display device that is capable, when selected, of initiating a search for requested contact information from the aggregate contact information that is associated with a classification corresponding with the selected filter link and of displaying said requested contact information.

15. A method as recited in claim 14, wherein the classification includes at least one of a key word, an organization, a group, a location, an event, and a social description.

16. A method as recited in claim 14, wherein the at least one filter is customizable and is configured to specifically correspond with one or more directories being searched for contact information.

17. A method as recited in claim 1, wherein at least some of the separate and distinct contact information directories are stored within a remote storage medium.

18. A method as recited in claim 17, wherein all of the separate and distinct contact information directories are stored within a local storage medium.

19. A method as recited in claim 17, wherein at least some of the separate and distinct contact information directories are stored in a storage medium remote from the local storage medium.

20. A method as recited in claim 1, wherein the displayed contact information can be selected, and wherein the method further includes at least one of displaying the contact information and displaying additional related information about the contact in a new frame at the display device.

21. In a computing system that is connected with a display device and that includes a user interface that is configured to display contact information at the display device, a method for displaying aggregate contact information from a plurality of separate and distinct contact information directories, the method comprising:
   an act of displaying, at the display device, a plurality of directory links, the directory links operably and correspondingly connecting the user interface with each of a plurality of separate and distinct contact information directories;
   an act of providing a frame at the display device that is configured for simultaneously displaying aggregated contact information from separate and distinct contact information directories in a designated view, the aggregated contact information being mapped according to a single unifying schema into categories and classifications that can be recognized by the user interface for display;
   an act of providing means for selectably changing the designated view of the displayed contact information to another one of a plurality of views, each view corresponding to a different pattern that is identifiable within the displayed contact information, and wherein the plurality of views include at least two of the following views:
   (a) an event view that graphically associates a plurality of different contacts with one or more events and that graphically distinguishes different events within the event view,
   (b) a location view that graphically associates a plurality of different contacts with one or more locations and that graphically distinguishes different locations within the location view, or
   (c) an operability view that graphically associates a plurality of different contacts with one or more system capabilities associated with systems available to the plurality of different contacts and that graphically distinguishes different system capabilities within the operability view.

22. A method as recited in claim 21, wherein means for selectably changing the designated view includes a drop down menu that identifies the plurality of views that can be selected, wherein selection of a new view from the plurality of identified views causes the user interface to display the requested contact information in the new view within the frame.

23. A method as recited in claim 21, wherein the different patterns corresponding to the plurality of views include a organizational pattern that organizationally relates the at least two contacts, and wherein the plurality of views include an organizational view that graphically identifies an organizational hierarchal structure for a particular organizational grouping of at least two contacts identified by the contact information.

24. A method as recited in claim 21, wherein selection of any event identified within the event view causes the user interface to display contacts associated with the event.

25. A method as recited in claim 21, wherein selection of any location identified within the location view causes the user interface to display contacts associated with the location.

26. A method as recited in claim 21, wherein selection of any operability grouping within the operability view causes the user interface to display contacts associated with systems having the corresponding operability.

27. A method as recited in claim 21, further comprising an act of providing means for searching by key term for one or more individual contact entries within the aggregate contact information containing the key term and wherein the searching means includes an input field that is displayed at the display device and that is capable of receiving input comprising at least part of a name, a word, a term, a telephone number, and an email address.

28. A method as recited in claim 21, further comprising an act of providing means for filtering the aggregate contact information according to classifications assigned to the aggregate contact information and wherein the filtering means includes at least one filter displayed at the display device that is capable, when selected, of initiating a search for requested contact information from the aggregate contact information that is associated with a classification corresponding with the selected filter link and of displaying said requested contact information.

29. A method as recited in claim 28, wherein the at least one filter is customizable and is configured to specifically correspond with one or more directories being searched for contact information.

30. A method as recited in claim 21, wherein at least some of the separate and distinct contact information directories are stored within a local storage medium.

31. A method as recited in claim 21, wherein at least some of the separate and distinct contact information directories are stored in a storage medium remote from the local storage medium.

32. A method as recited in claim 21, wherein means for selectably changing the designated view includes a menu that identifies the plurality of views that can be selected, wherein selection of a new view from the plurality of identified views causes the user interface to display the requested contact information in the new view within the frame, and wherein the plurality of views includes all of the following:
   a social view that displays a social relationship of at least two contacts;
   an organizational view that displays an organizational relationship of at least two contacts;
   an event view that displays an event relationship of at least two contacts;

a location view that displays a relationship of at least two contacts corresponding with at least one of a geographic location, time location, virtual location, and structural location; and an operability view that displays a relationship of at least two contacts corresponding with the operability of at least one of the contacts telephone, email, instant messaging, and gaming capabilities.

33. A method as recited in claim 21, wherein the plurality of views includes a view that graphically distinguishes contacts according to a most frequently contacted order.

34. A computer program product comprising one or more computer-readable storage media storing computer-executable instructions for implementing the method recited in claim 2.

35. A computer program product as recited in claim 34, wherein means for selectably changing the designated view includes a menu that identifies the plurality of views that can be selected, wherein selection of a new view from the plurality of identified views causes the user interface to display the requested contact information in the new view within the frame, and wherein the plurality of views includes at least one of the following:

a social view that displays a social relationship of at least two contacts;

an organizational view that displays an organizational relationship of at least two contacts;

an event view that displays an event relationship of at least two contacts;

a location view that displays a relationship of at least two contacts corresponding with at least one of a geographic location, time location, virtual location, and structural location; and an operability view that displays a relationship of at least two contacts corresponding with the operability of at least one of the contacts telephone, email, instant messaging, and gaming capabilities.

36. A computer program product as recited in claim 34, wherein searching means includes an input field that is displayed at the display device and that is capable of receiving input comprising at least part of a name, a word, a term, a telephone number, and an email address.

37. A computer program product as recited in claim 34, wherein filtering means includes at least one filter link displayed at the display device that is capable, when selected, of initiating a search for requested contact information from the aggregate contact information that is associated with a classification corresponding with the selected filter link and of displaying said requested contact information.

38. A computer program product as recited in claim 34, wherein at least some of the separate and distinct contact information directories are stored within a local storage medium.

39. A computer program product as recited in claim 34, wherein at least some of the separate and distinct contact information directories are stored in a storage medium remote from the local storage medium.

40. A computer program product comprising one or more computer-readable storage media storing computer-executable instructions for implementing the method recited in claim 21.

* * * * *